Patented Apr. 15, 1952

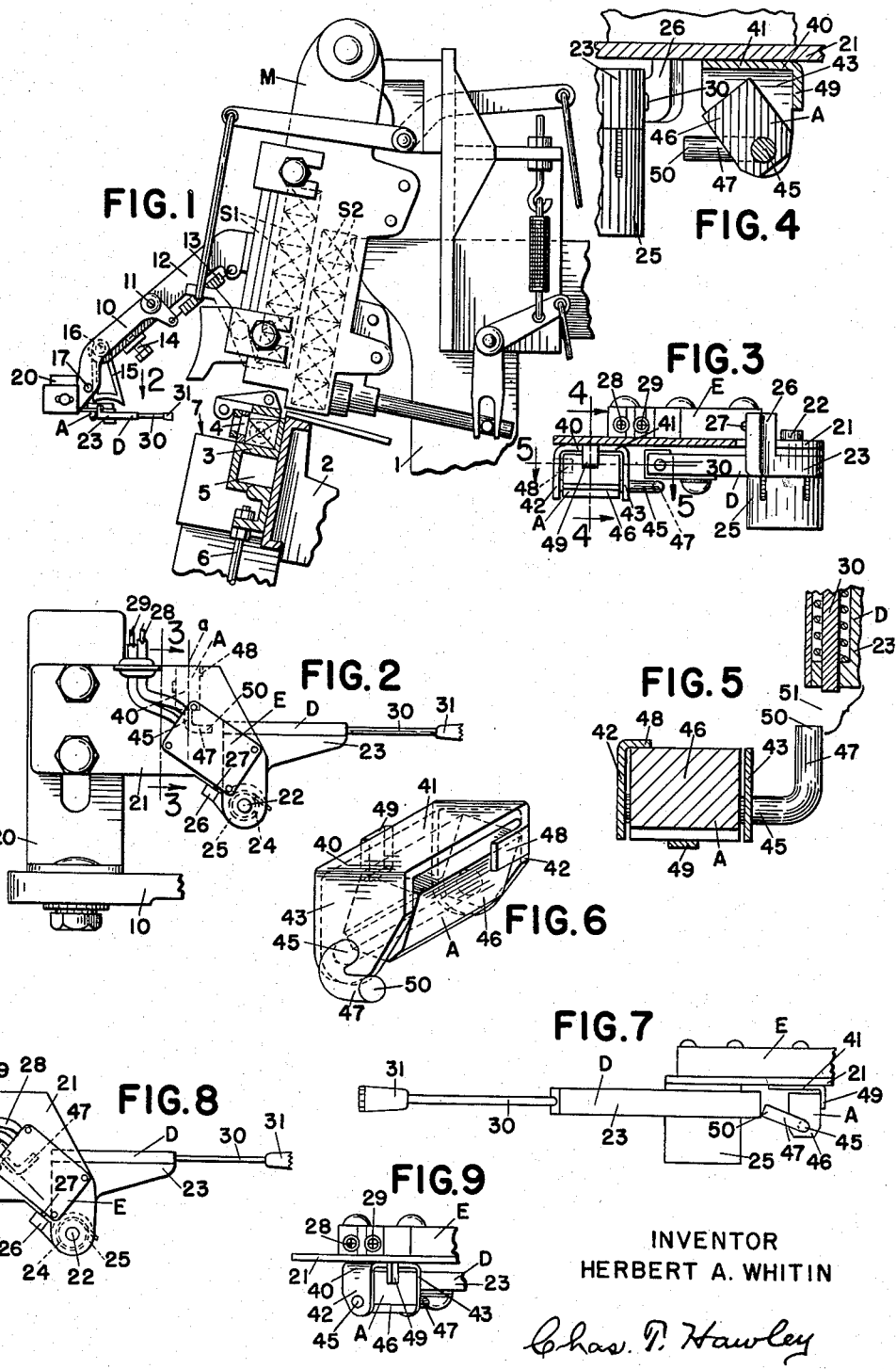

2,593,079

UNITED STATES PATENT OFFICE 2,593,079

WEFT DETECTING MECHANISM FOR LOOMS

Herbert A. Whitin, Worcester, Mass., assignor to Crompton & Knowles Loom Works, Worcester, Mass., a corporation of Massachusetts Application December 14, 1950, Serial No. 200,815

11 Claims. (Cl. 139—271)

This invention relates to improvements in weft detectors for looms and it is the general object of the invention to provide simple means for preventing the detector from giving a false indication of weft exhaustion when it is moved incident to a replenishing operation of the loom.

Certain types of weft replenishing looms have their weft detectors located at the replenishing side, such for instance as multicolor bobbin or shuttle changing looms. When a weft replenishing operation occurs it is necessary to move the detector out of the path of moving parts, such as a bobbin or shuttle box in order to prevent breakage of the detector when the replenishing operation occurs. If the detector is of the side slipping type employing the pivoted lever for the detector finger there is likelihood that the lever due to its momentum will rock to give a false indication of weft exhaustion incident to movement of the detector.

It is an important object of the present invention to provide stop means normally positioned to permit swinging movement of the detector lever during normal detecting operations of the loom but moved into lever stopping position due to its momentum when the detector is moved bodily incident to a replenishing operation of the loom.

In a known shuttle changing loom the detector is mounted on a relatively long support arm which because of its length is subject to some lateral vibration so that the detector, in addition to its normally intended forward motion on a shuttle changing operation of the loom, is also subject to a lateral motion tending to cause the detector lever by its momentum to give a false indication. It is a further object of the invention to provide a weighted stop having its axis oblique with respect to both the forward and the lateral movements of the detector so that by its momentum it can move into stopping position whether the detector is moved forwardly or moved laterally due to vibration.

It is a further object of the invention to provide the weft detector with a base having a detector lever pivoted thereto and provide a weighted stop movable pivotally with respect to and moving with the base so that whenever the detector lever tends to give a false indication due to its momentum such indication will be prevented by the stop which due to its momentum moves into stopping relation with respect to the lever.

It is a still further object of the invention to provide a stop of the type previously mentioned including a weight and a counter-weight therefor normally held by gravity in nonstopping position but moved by the weight into stopping position with respect to the indicating lever when the weight moves due to its momentum.

The detector lever and the stop for it are both likely to start moving at the same time due to their respective momentums, and in order to permit the stop to get into stopping position before the detector lever has moved too far it is a further object of the invention to have the stop sufficiently forward of the lever so that it will have opportunity to move into stopping position before the lever can pass the stop. There may be some motion of the detector lever but it will be insufficient to give a false indication of weft exhaustion.

With these and other objects in view which will appear as the description proceeds, the invention resides in the combination and arrangement of parts hereinafter described and set forth.

In the accompanying drawings, wherein two forms of the invention are set forth,

Fig. 1 is a side elevation of part of a shuttle changing loom showing the preferred form of the invention applied thereto, the lay and shuttle box structure being in section, Fig. 2 is an enlarged plan view looking in the direction of arrow 2, Fig. 1, Fig. 3 is an enlarged vertical section on line 3—3, Fig. 2, Fig. 4 is an enlarged vertical section on line 4—4, Fig. 3, Fig. 5 is an enlarged horizontal section on line 5—5, Fig. 3, Fig. 6 is a perspective view of the stop unit detached from the weft detector base, Fig. 7 is a diagrammatic view showing the invention in operating position to prevent rocking of the detector lever, Fig. 8 is a view similar to a portion of Fig. 3 but showing a modified form of the invention, and Fig. 9 is a front view on an enlarged scale looking in the direction of arrow 9, Fig. 8.

Referring to Fig. 1, the loom frame 1 supports a reserve bobbin magazine M having front and back stacks S1 and S2 of reserve shuttles. The lay 2 which reciprocates backwardly and forwardly has mounted for vertical motion thereon a shuttle box structure 3 having an upper shuttle box 4 and a lower shuttle box 5. This structure is mounted on a box lifter rod 6 which is normally in low position so that the top shuttle box 4 is in register with the race plate 7 of the lay 2. When a shuttle changing operation is to occur the structure 3 will be in high position so that the oncoming depleted shuttle will enter the lower shuttle box 5 and a reserve shuttle drawn from one or the other of the reserve stacks S1 or S2 will be moved into the top shuttle box 4 when the lay next reaches its rear position. The shifting of the shuttle box structure 3 occurs while the lay is near its front center position, or to the extreme left viewed in Fig. 1, and at a time when the weft detector mechanism designated generally at D would ordinarily enter the top box.

In order to prevent the shuttle box structure from damaging the weft detector the latter is mounted on a lever 10 pivoted as at 11 to a stationary arm 12 fixed with respect to and projecting forwardly from the magazine M. A spring 13 normally holds the lever 10 against a stop screw 14 to position the detector correctly for a detecting operation. A displacer 15 is pivoted as at 16 to the lower end of arm 12 and is rearward of a pin 17 on the lever 10. When the shuttle box structure 3 is above its normal position and is moving forwardly some part of it will engage the displacer 15 to rock it in a clockwise direction as viewed in Fig. 1 and by means of pin 17 rock the lever 10 to move the detector D to the left, Fig. 1, so that it will be moved forwardly to a position where it cannot be damaged by the shuttle box structure.

The matter thus far described is part of a well-known multicolor shuttle changing loom and may be made as set forth for instance in prior Patents Nos. 2,126,061 and 2,135,155.

The lever 10 has secured with respect thereto a stand 20 to which is bolted the base 21 of the weft detector D. This base extends rearwardly from the stand 20 and has secured thereto an upright stud 22 on which is pivoted a detector lever 23. A spring 24 surrounds the stud 22 and has one end thereof operatively connected to the detector lever and has the other end thereof connected to a drum 25 secured in adjusted angular position on the stud 22. The effect of the spring is to turn the lever 23 in a clockwise direction as viewed in Fig. 2 so that a finger 26 on the lever will engage and depress plunger 27 of an electric switch E secured to the top of the base 21. The spring 24 is normally strong enough to enable the finger 26 to keep the plunger 27 pressed inwardly with respect to the switch E, a position corresponding to the open condition of the switch, but when the lever 23 rocks incident to indication of weft exhaustion the finger 26 will move away from the plunger and the latter will move outwardly with respect to the switch to effect closure of the latter and electrically connect two wires 28 and 29 which lead to loom controlling means which in the present instance initiates a shuttle changing operation.

A weft detector finger 30 is mounted for back and forth sliding on the lever 23 along a line to one side of the pivot of the lever. The feeler tip 31 of the finger 30 when engaging a sufficient supply of weft will be held against a side slipping operation and the finger will be moved forwardly as the lay advances without substantial angular motion of the lever 23. When however the weft supply being detected is substantially exhausted the tip 31 will slip laterally to rock the lever 23 in a counter-clockwise direction, Fig. 2, thereby closing the switch E and giving an indication of weft exhaustion.

The detector finger 30 and its lever 23 may be made in any approved manner and the details of construction are omitted since it is believed sufficient to state that the finger 30 will be moved rearwardly after a detecting operation by structure located within the detector lever 23, but not shown herein. An example of such a weft detector reference may be had to Cederlund Patent No. 2,500,518.

When the displacer 15 acts to move the detector D forwardly there is likely to be a rocking of lever 23 due to its momentum. Such rocking would move the finger 26 away from the plunger 27 and give a false indication unless such rocking were prevented. It is the general purpose of the present invention to prevent sufficient rocking of lever 23 to permit closure of the switch E.

In carrying the invention into effect there is secured to the under side of the plate or base 21 a stop mechanism A shown in Fig. 6. This mechanism includes a bearing member 40 having a flat top 41 secured to the under side of the base 21 and having depending sides 42 and 43. Extending through and rockably mounted on the depending sides 42 and 43 is a pivot member 45 which is secured in any approved manner to a weight 46 which extends upwardly from the pivot member. The pivot member has a lateral extension 47 serving as a counterweight for the weight 46 and normally holding the latter against a stop lug 48 on wall 42. A second stop 49 depends from the base 40 on the opposite side of the weight and limits motion of the latter in a clockwise direction as viewed in Fig. 4.

The pivot member may conveniently be made of a piece of wire having a laterally bent end constituting the previously described counterweight. The stop lug 48 normally holds the lateral extension or counterweight 47 below the detector lever 23 so that the latter is free to rock on its pivot under normal weft detecting operations when the base 21 is stationary, as will be understood from Figs. 4 and 6. The rear end 50 of the counterweight is spaced forwardly from the adjacent part of the lever 23 a short distance indicated at 51 in Fig. 5.

When the detector D is moved forwardly as previously described the weight 46 due to its momentum will tend to rock in a clockwise direction as viewed in Fig. 4, thereby lifting the counterweight 47 into the path of angular motion of the lever 23 to prevent substantial rocking of the latter, or sufficient rocking of it to give a false indication of weft exhaustion.

Both the detector lever 23 and the weight 46 are likely to start rocking under their momentums at substantially the same time, but the space 51 is sufficient to enable the stop member 47 to rise to stopping position before the lever 23 can pass the stop member. The weighted stop 46 will move against the stop lug 49 which will then arrest further angular motion of the weight and hold the lateral extension 47 in stopping position. When the momentum forces of the detector lever 23 and weight 46 are spent the lateral extension 47 acting as a counterweight will restore the weight to its normal position shown in Fig. 4.

As already mentioned the arm 12 is of sufficient length so that the detector D may be subject to some lateral vibration in the direction of line a, Fig. 2. This vibration will ordinarily not be sufficient to cause the lever by its momentum to give a false indication, but when the vibration is sufficient to cause such a false indication it may be desirable to dispose the stop mechanism 40 with the axis of the weight 46 oblique with respect both to the back and forth motion of the detector D and to its lateral motion in the direction of line *a*, Fig. 2. This may be accomplished by securing the base 41 to the under side of the base 21 as set forth more particularly in the modified form of the invention shown in Figs. 8 and 9. In these figures the axis of the weight 46, designated by line *b*, is oblique and the weight will be responsive to motion of the base 21 occurring when the detector D is moved forwardly intentionally or has a lateral motion due to loom vibration. The stop mechanism in the modified form of the invention will be substantially the same as that described in the preferred form except for its angular relation with respect to the base 21. In the preferred form the axis of the weight 46 is transverse of and substantially perpendicular to the back and forth given direction of motion induced by the displacer 15, whereas in the modified form the axis is oblique with respect to this given direction.

From the foregoing it will be seen that the invention sets forth simple self-acting means which operates to prevent substantial angular motion of a detector lever 23 when the latter tends to rock due to its momentum incident to movement of the base 21. The stop means comprising a weight which is responsive to motion of the base 21 and acts by its momentum to lift the lateral extension 47 from a normal position clear of the path of rocking of the lever 23 into the path to arrest substantial rocking of the lever. The lateral extension acts as a counterweight and tends to hold a primary weight 46 in the position shown in Fig. 4. The rear end 50 of the lateral extension 47 is spaced forwardly of the detector lever, as at 51, a sufficient distance to permit the stop extension to rise to stopping position before the detector lever can pass it. In the preferred form of the invention the axis of the weight 46 is substantially perpendicular to the given direction of motion of the base 21 caused by the displacer 15, but in the modified form of the invention the axis of the weight is oblique so that the weight can respond not only to displacement caused by member 15, but also by transverse motion in the direction of line *a*, Fig. 2, due to vibration of the loom. While the invention has been set forth in connection with the weft detector for a shuttle changing loom it is to be understood that certain features of the invention are equally usable in those forms of looms wherein the weft detecting mechanism is at the replenishing end of a bobbin changing loom and is moved forwardly incident to a bobbin changing operation. The bearing 40 may conveniently be made of flat sheet metal bent to form the walls 42 and 43 in which the wire forming the pivot member can turn freely.

Having thus described the invention it will be seen that changes and modifications of the foregoing specific disclosure may be made without departing from the spirit and scope of the invention.

What is claimed as new is:

1. In weft detector mechanism for a weft replenishing loom, a base which has a movement incident to a weft replenishing operation of the loom, a detector lever pivoted on the base effective to indicate weft exhaustion when having an angular movement with respect to said base and tending to have said angular movement incident to said movement of said base, and a stop mounted for movement on said base normally out of stopping position relative to said lever but moved due to momentum thereof into stopping position relative to said lever when the base has said movement to prevent angular movement of said lever relative to said base.

2. In weft detector mechanism for a weft replenishing loom, a base which has a movement from the normal position thereof incident to a weft replenishing operation of the loom, a detector lever pivoted on the base effective to indicate weft exhaustion when having an angular movement with respect to said base and tending to have said angular movement incident to said movement of said base, a detector finger effective when engaging a bobbin depleted of weft to move said lever angularly with respect to said base, and a stop mounted for movement on said base normally out of the path of movement of said lever to enable said finger to move said lever angularly with respect to said base but moved into said path due to momentum thereof to prevent angular movement of said lever relative to said base when the latter has said movement thereof.

3. In weft detector mechanism for a weft replenishing loom, a base which has a movement incident to a weft replenishing operation of the loom, a detector lever pivoted on the base effective to indicate weft exhaustion when having an angular movement with respect to said base and tending to have said angular movement incident to said movement of said base, and a weighted stop pivoted on said base normally out of the path of angular movement of said lever but moved into said path due to momentum thereof to prevent angular movement of said lever relative to said base when the latter has said movement thereof.

4. In weft detector mechanism for a weft replenishing loom, a base which has a movement in a given direction incident to a weft replenishing operation of the loom, a detector lever pivoted on the base effective to indicate weft exhaustion when having an angular movement with respect to said base and tending to have said angular movement incident to said movement of said base, and a weighted stop pivoted on said base to rock about an axis transverse of said given direction and normally out of the path of angular movement of said lever but moved into said path due to momentum thereof to prevent angular movement of said lever relative to said base when the latter has said movement thereof.

5. In a weft detector mechanism for a weft replenishing loom, a base which has a movement in a given direction and is subject to a movement transverse of said given direction incident to a weft replenishing operation of the loom, a detector lever pivoted on the base effective to indicate weft exhaustion when having an angular movement with respect to said base and tending to have said angular movement incident to said movement of said base, and a weighted stop pivoted on said base to rock about an axis oblique to said given direction and normally out of the path of angular movement of said lever but moved into said path due to momentum thereof to prevent angular movement of said lever relative to said base when the latter has said movement thereof.

6. In weft detector mechanism for a weft replenishing loom, a base which has a movement incident to a weft replenishing operation of the loom, a detector lever pivoted on the base effective to indicate weft exhaustion when having an angular movement with respect to said base and tending to have said angular movement incident to said movement of said base, and a stop pivoted on said base including a weight and a counterweight, the latter being normally out of the path of angular motion of said lever due to gravity but moved into said path by said weight due to the momentum of the latter to prevent angular motion of the lever relative to said base when the latter has said movement thereof.

7. In weft detector mechanism for a weft replenishing loom, a base which has a movement incident to a weft replenishing operation of the loom, a detector lever pivoted on the base effective to indicate weft exhaustion when having an angular movement with respect to said base and tending to have said angular movement incident to said movement of said base, a bearing on said base, a weight, and a pivot member secured to said weight rockable in said bearing and having a lateral extension acting as a counterweight normally out of the path of angular motion of said lever due to gravity but moved into said path by said weight due to momentum of the latter to prevent angular motion of the lever relative to said base when the latter has said movement thereof.

8. The structure set forth in claim 7 wherein said pivot member is a wire and said lateral extension constitutes an end of the wire bent laterally from the axis of said bearing.

9. In weft detector mechanism for a weft replenishing loom, a base which has a movement in a given direction from the normal position thereof incident to a weft replenishing operation of the loom, a detector lever pivoted on the base effective to indicate weft exhaustion when having an angular movement with respect to said base and tending to have said angular movement incident to said movement of said base, a bearing on said base having an axis transverse of said given direction, a weight, and a pivot member secured to said weight rockable in said bearing and having a lateral extension acting as a counterweight normally out of the path of angular motion of said lever but moved into said path by said weight due to the momentum of the latter to prevent angular motion of the lever relative to said base when the latter has said movement thereof.

10. The structure set forth in claim 9 wherein said base is subject to a movement transverse of said given direction when having said movement and wherein said axis is oblique with respect to said given direction.

11. In weft detector mechanism for a weft replenishing loom, a base which has a movement incident to a weft replenishing operation of the loom, a detector lever pivoted on the base effective to indicate weft exhaustion when having an angular movement with respect to said base and tending to have said angular movement incident to said movement of said base, and a weighted stop pivotally mounted on said base normally out of the path of said lever, said lever and stop both moving pivotally with respect to said base incident to said movement of the base, said stop being spaced from the lever and swinging due to momentum thereof into stopping position relative to said lever before the latter due to the momentum thereof is able to swing sufficiently to indicate weft exhaustion.

HERBERT A. WHITIN.

REFERENCES CITED

The following references are of record in the file of this patent:

UNITED STATES PATENTS

| Number | Name | Date |
| --- | --- | --- |
| 2,479,845 | Krukonis | Aug. 23, 1949 |
| 2,498,322 | Whitin | Feb. 21, 1950 |